J. W. CARNOCHAN.

FRUIT PEELING MACHINE.

APPLICATION FILED DEC. 24, 1908.

1,040,507. Patented Oct. 8, 1912.

3 SHEETS—SHEET 1.

Witnesses

Nelson Copp.

H. W. Simms

Inventor

John W. Carnochan by Church & Rich his Attorneys

J. W. CARNOCHAN.
FRUIT PEELING MACHINE.
APPLICATION FILED DEC. 24, 1908.
1,040,507 Patented Oct. 8, 1912.
3 SHEETS—SHEET 2.
Fig. 2.
Fig. 6.
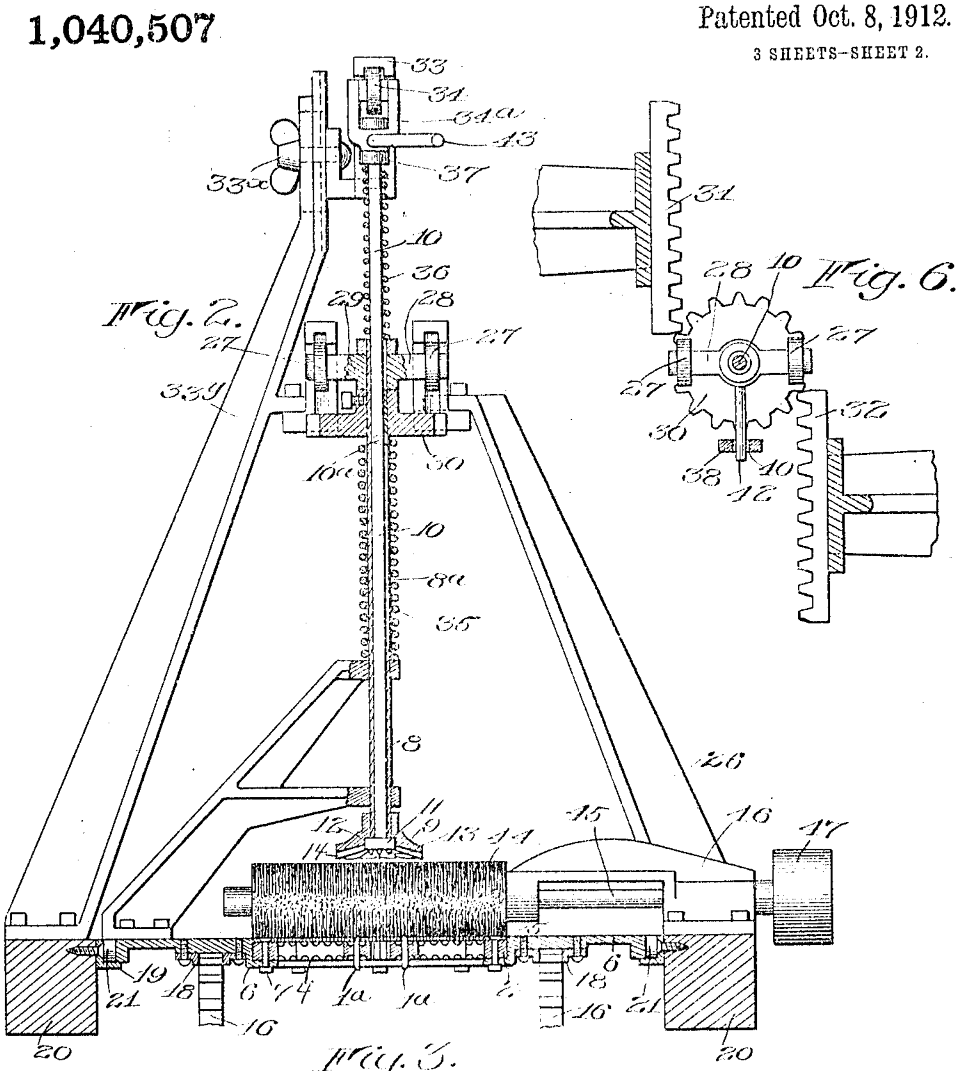
Fig. 3.
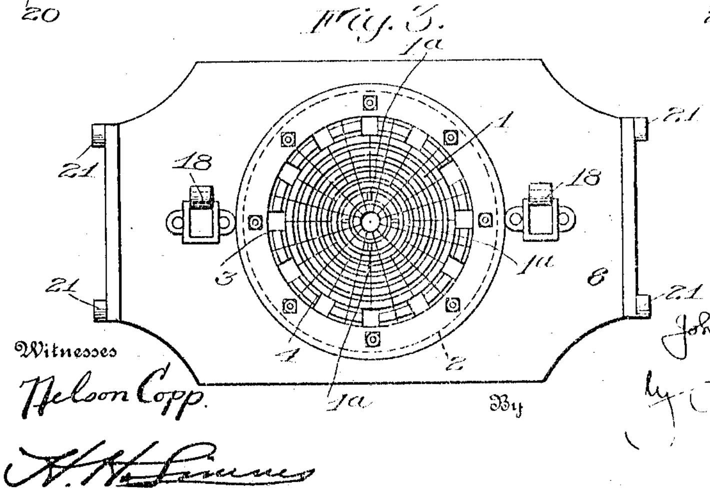
Witnesses
Nelson Copp.
H. H. Simms
Inventor
John W. Carnochan
By
Attorneys

J. W. CARNOCHAN.

FRUIT PEELING MACHINE.

APPLICATION FILED DEC. 24, 1908.

1,040,507.

Patented Oct. 8, 1912.

3 SHEETS—SHEET 3.

Inventor

John W. Carnochan

Witnesses

Nelson Copp.

H. B. Linnus

By Church & Rich his Attorneys

UNITED STATES PATENT OFFICE.

JOHN W. CARNOCHAN, OF ROCHESTER, NEW YORK, ASSIGNOR OF ONE-HALF TO HARRY WALTERS AND ONE-HALF TO FREDERICK H. DAMON, BOTH OF ROCHESTER, NEW YORK.

FRUIT-PEELING MACHINE.

1,040,507. Specification of Letters Patent. Patented Oct. 8, 1912.

Application filed December 24, 1908. Serial No. 469,048.

*To all whom it may concern:*

Be it known that I, JOHN W. CARNOCHAN, of Rochester, in the county of Monroe and State of New York, have invented certain new and useful Improvements in Fruit-Peeling Machines; and I do hereby declare the following to be a full, clear, and exact description of the same, reference being had to the accompanying drawings, forming a part of the specification, and to the reference-numerals marked thereon.

The present invention relates to the removing of skin from fruit such for instance as tomatoes and it has for an object to provide a construction which will operate on the fruit with the least possible injury thereto and at the same time will effectively remove the skin from all portions thereof.

To these and other ends the invention consists in certain improvements and combinations of parts all as will be hereinafter more fully described, the novel features being pointed out in the claims at the end of the specification.

Figure 1:
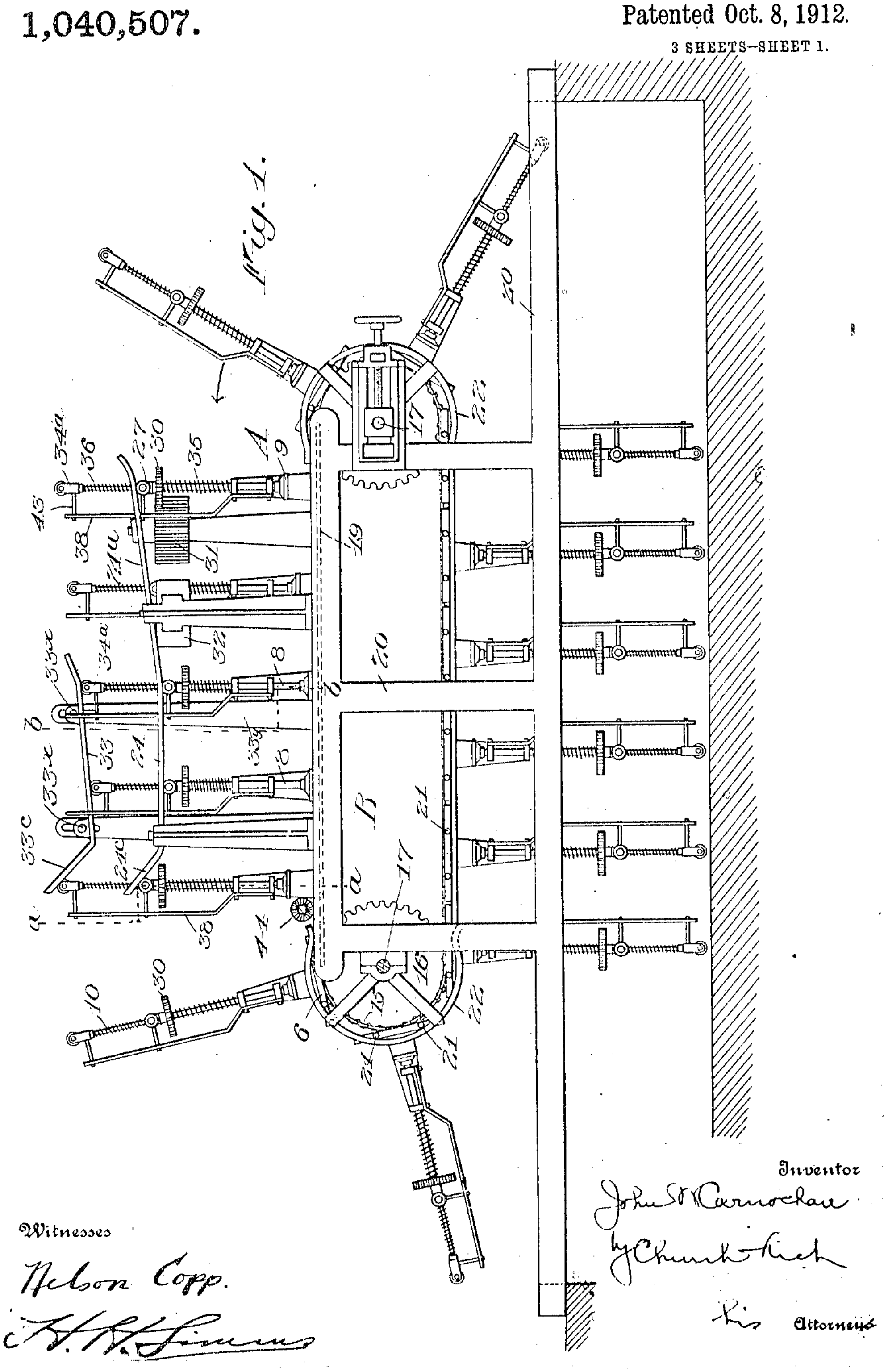
Figure 4:
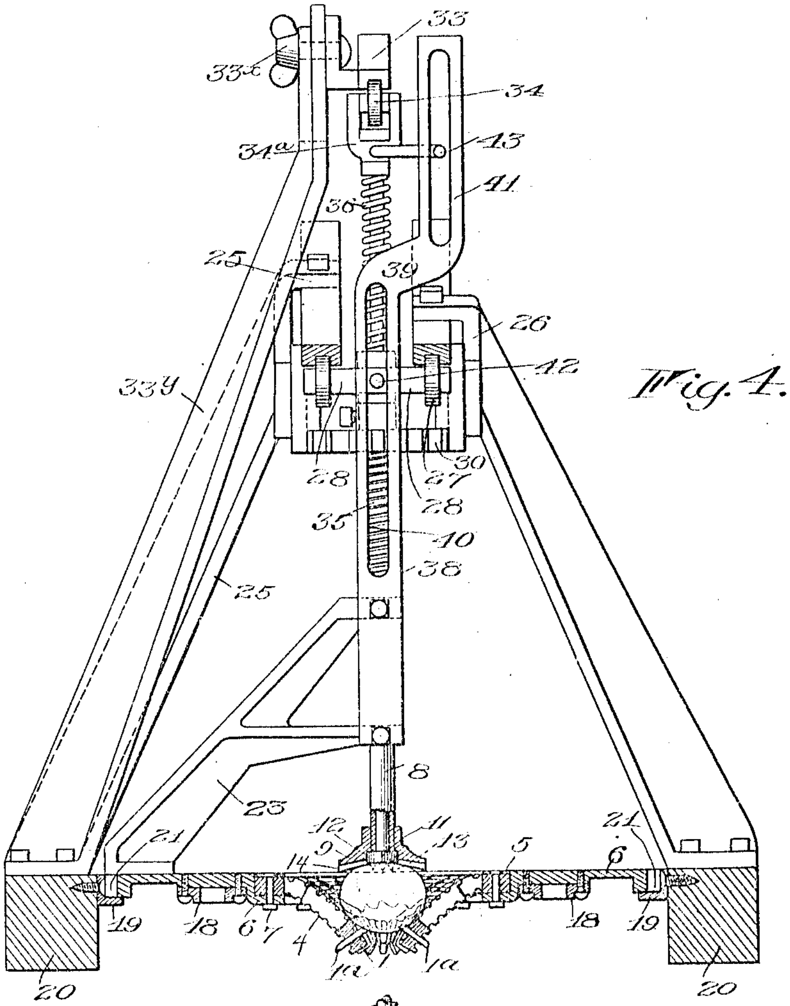
Figure 5:
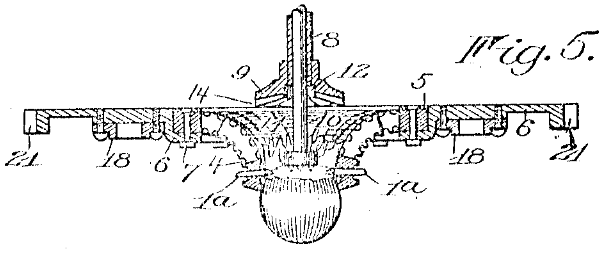

In the drawings: Figure 1 shows in side elevation a machine constructed in accordance with this invention. Fig. 2 is a section on line *a—a* Fig. 1. Fig. 3 is a plan view of an embodiment of the device which coöperates with the fruit to remove the skin. Fig. 4 is a sectional view on line *b—b* Fig. 1 showing one position of the machine during the removal of the skin. Fig. 5 is a detail view showing another position of the machine during the skinning, and Fig. 6 is a detail view illustrating an embodiment of the mechanism which effects the removal of the "blow" of the fruit.

Owing to the delicate structure of tomatoes, great difficulty has been met in removing the skin by machinery without injury to the fruit. In this invention the fruit which has previously been steamed or treated with hot water is acted upon by a skin removing device while being supported in coöperative relation with said device in such a manner that injury to the fruit is practically prevented. In addition to removing the skin, the machine is so constructed that it is also possible to remove the blow of the fruit, a part which has heretofore been removed only by hand.

The skin removing device preferably embodies a plurality of fingers or wipers 1 adapted to frictionally contact with the fruit at a plurality of points about the same and consisting if desirable of radially arranged wedge or V shaped pieces of elastic or resilient material such as rubber, having their pointed ends disposed toward one point and their larger ends secured against movement as by being formed in one piece with a surrounding supporting portion 2, the larger ends being if necessary provided with openings 3 which increase their resiliency at their points of attachment. In order to increase the friction producing qualities of the fingers, they may be provided with transverse grooves 4 forming ribs which are preferably arranged in concentric arcs so that concentric rings are formed on the fingers as a whole, thus causing the grooves to conform to the fruit. These grooves may be formed on both sides of the fingers so that the skin removing device may be reversed when worn on one side, and for this purpose an annular clamping plate 5 which engages the supporting portion 2 is removably held thereto and to a base 6 by bolts 7. There may be arranged on one or more of the fingers or wipers, preferably on four of them, near their free ends and on both sides, slitters or cutters $1^a$ which act on the skin of the fruit as the latter passes through the skin removing device and slit the skin so that it may be more easily removed.

Coöperating with the skin removing device is a means which in this instance moves relatively to the said device to force the fruit through the wipers. It preferably is mounted to move toward and from or in other words to reciprocate relatively to the skin removing device on one side of the latter, and for this purpose may embody a plunger 8 having at one side a cup 9 or concave member to receive the fruit and support it while the skin is being partially removed. The cup preferably does not pass through the skin removing device but only to the normal plane of the wipers so that the cutters will not be engaged and the return movement of the plunger will not be retarded as it would otherwise be by the engagement of the wipers behind the cup after the discharge of the fruit.

In order to complete the movement of the fruit through the skin removing device there may be employed a separate device preferably comprising a plunger 10 having a head 11 at one end of less diameter than the space inclosed by the cutters to engage the fruit. The plunger 10 is preferably mounted concentric with and within the plunger 8 which for this purpose is made hollow, while the head 11 seats in a pocket 12 in cup 9 and is concealed by the latter. The two plungers are moved together preferably to the normal plane of the wipers to partially remove the skin and then the plunger 10 moves independently of plunger 8 to complete the removal of the skin and eject the skinned fruit. In this instance the head 11 provides the connection which causes the inner plunger 10 to move upwardly with the outer plunger 8.

In removing the skin from tomatoes a great deal of difficulty is experienced in detaching the "blow" and the portions of the skin in proximity thereto. This is accomplished in this embodiment by frictionally engaging the blow and rotating the engaging part relatively to the fruit while the latter is held on a suitable support. The support in this instance is the skin removing device, while the loosening of the "blow" and the surrounding skin is effected by providing projections 13 or other roughened surface on the head 11 and radially corrugating the cup 9 at 14 so that on the rotation of these parts after the movement of the two plungers together to clamp the fruit, the skin will be loosened at and about the "blow". The plungers 8 and 10 may be caused to turn together by a pin or projection $10^a$ on plunger 10 working in a slot $8^a$ in plunger 8, the slot being provided to permit a relative movement between the plungers.

The skin removing device and the plungers 8 and 10 may be mounted in any suitable manner but in order to obtain the greatest output, a series of skin removing devices are provided and they are caused to travel in an endless path as for instance by being mounted on an endless carrier which may comprise two parallel sprocket chains 15 traveling about pulleys 16 arranged in pairs on two shafts 17, the base 6 of each skin removing device being secured to a link 18 of each chain. By connecting each base to only one link of each chain the bases are permitted to pass about the pulleys 16, but this arrangement will cause the bases to wabble if no means are provided to prevent it. Therefore, while a skin removing device is in operation it is caused to travel on tracks 19 arranged on opposite sides of the endless carrier on a frame 20 that may also support the shafts 17, rollers 21 being provided at each end of each base to travel on the tracks 19. Curved tracks 22 are arranged beyond the endless carrier to receive the rollers 21 as the skin removing devices pass about the pulleys. The plungers 8 and 10 may be carried with the skin removing devices and the base of each of the latter has for this purpose, a bracket 23 in which a plunger 8 is guided.

To effect coöperation between the plungers 8 and the skin removing devices there may be employed one or more grooved cams or guides 24 (in this instance two) supported on opposite sides of the plungers by arms 25 and 26 extending upwardly from the frame 20. Each cam has a portion $24^a$ arranged at an angle to the path of a portion of the endless carrier to act on the plungers 8 preferably by engaging two rollers 27 that are aranged on arms 28 extending in opposite directions from bearing blocks 29 journaled on the upper portions of plungers 8.

While the plungers 8 are held down by that portion of cam 24 which lies parallel with the path of movement of endless carrier, the independent movements of the plungers 10 may be effected by a grooved cam track 33 which is adjustable at $33^x$ on a bracket $33^y$ and is arranged at an angle to the path of travel of the endless carrier to coöperate with a roller 34 on the upper end of each plunger 10. The rollers 34 are mounted on blocks $34^a$ in which the plungers 10 are adapted to turn for removing the blow. Of course the rollers 34 and bearing blocks 29 should not shift relatively to the tracks or cams 33 and 24 and therefore there is provided for each pair of plungers 8 and 10 a strip or bar 38 extending upwardly from the bracket 23 and deflected or bent at 39 so that the upper portion will clear the track 34. This bar is slotted at 40 and 41 to receive pins 42 and 43 extending from the blocks 29 and $34^a$ respectively permitting the blocks to move vertically with the plungers but holding them against turning therewith.

In order to effect the rotation of the plungers to remove the "blows" of the fruit, the plungers 8 may have gears 30 rigidly secured thereto so as to coöperate with one or more fixed racks as the carrier moves along its path. In this embodiment two racks 31 and 32 are provided on opposite sides of the path of the gears 30 to alternately mesh with the latter and rotate them in opposite directions. Preferably the racks are arranged in proximity to the inclined portion $24^a$ of the cam so that the rotation of the plungers takes place before the independent movement of plunger 10 and during the movement plungers 8 and 10 together toward the skin removing device.

The plungers 8 and 10 are normally held away from the skin removing devices and this is effected in this embodiment by two helical springs 35 and 36 for each two plungers, the former surrounding a plunger 8 and abutting at its ends a bracket 23 and a gear 30, while the latter abuts the upper end of a plunger 8 at one end and a collar 37 on the plunger 10. To the end of preventing the action of these springs taking place too suddenly the cams 24 and 33 are provided with portions $24^c$ and $33^c$ respectively that are inclined relatively to the path of the endless carrier and coöperate with the rollers on the two plungers to gradually release the plungers after the ejection of the fruit.

The cleaning of the skin removing devices may be produced by a rotary brush 44 supported independently of the endless carrier on the sides of the bases 6 opposite those sides which carry the brackets 23, so that the latter in traveling will not interfere with the brush. In this instance, the brush shaft 45 is journaled in a bracket 46 that overhangs the endless carrier and is secured to the frame of the machine, the brush being, if desirable, driven by a pulley 47.

In using this embodiment of the invention, the fruit having been subjected to steam or hot water, is fed by hand or otherwise successively to the skin removing devices passing the position A Fig. 1, the "blow" of the fruit being directed upwardly. Each skin removing device and its coöperating plungers 8 and 10 then pass to the cams 24 and 33 which first move both plungers 8 and 10 together to partially remove the skin and to support it during this operation and then move the plunger 10 independently of the plunger 8 to complete the removal and eject the fruit at or about position B into a suitable receptacle. It will be noted that the large cupped head of a plunger 8 engages the fruit while the hardest work of forcing the fruit through a skin removing device is being performed so that the small head of plunger 10 may effectually complete the removal without injury to the fruit. The large cups and the heads 11 at the ends of plungers 8 and 10 in turning before the independent movement of plungers 10 effectively loosen the "blows" and portions which cannot be reached by the wipers and the latter have only to drag the loosened skin from the top. The cutters also facilitate the removal of the skin as the wipers are not compelled to tear the skin and can therefore act as wipers during the entire movement of the fruit past them. After the ejection the skin removing devices are passed to the brush 44 which continuously rotating effectively cleans them.

Owing to the fact that the plungers successively operate on successive traveling skin removing devices it is possible to skin a number of fruit at one time and in this manner a large output is obtained. The fruit in all instances is discharged in an uninjured condition with the skin removed from all portions thereof and may then be conducted to a suitable cooking apparatus without further handling, thus making it possible to can the fruit in a sanitary manner.

I claim as my invention:

1. The combination of a fruit skin removing device having yielding portions mounted to support the fruit prior to the removal of the skin, with means for forcing the fruit through said device to effect the removal of the skin.

2. The combination of a fruit skin removing device having yielding wipers mounted to support the fruit prior to the removal of the skin and to coöperate with the latter at a plurality of points about the same when it is forced through the wipers, with means for forcing the fruit through the wipers to effect the removal of the skin.

3. The combination with a fruit skin removing device having yielding portions adapted to frictionally contact with fruit at a plurality of points about the same, of means coöperating with the fruit and having a movement on one side of the skin removing device toward the same to effect the removal of the skin and a movement on the same side of the skin removing device away from the latter after the skin has been removed.

4. The combination with a fruit skin removing device having yielding portions adapted to frictionally contact with the fruit at a plurality of points about the same, of reciprocal means coöperating with the fruit to force it through the skin removing device.

5. The combination with a fruit skin removing device having yielding portions adapted to frictionally contact with fruit at a plurality of points about the same, of a reciprocal plunger to force the fruit through the skin removing device.

6. The combination with a fruit skin removing device having yielding portions adapted to frictionally contact with fruit at a plurality of points about the same, of a cup engaging the fruit and movable to cause the latter to coöperate with the skin removing device.

7. The combination with a fruit skin removing device having yielding portions adapted to frictionally contact with fruit at a plurality of points about the same, of a reciprocal member carrying a cup to engage the fruit and movable to cause the latter to coöperate with the skin removing device.

8. The combination of a fruit skin removing device having yielding portions mounted to support the fruit prior to the removal of the skin, with reciprocal means for forcing the fruit through the skin removing device to remove the skin.

9. A fruit skin removing machine comprising a fruit skin removing device having yielding portions mounted to support the fruit prior to the removal of the skin, and a cup for engaging the fruit to cause the latter to coöperate with the skin removing device.

10. A fruit skin removing machine comprising a fruit skin removing device having yielding portions and a support for the fruit during the removal of the skin, one being mounted to reciprocate relatively to the other, and the former having means to frictionally contact with fruit at a plurality of points about the same.

11. A fruit skin removing machine comprising a fruit skin removing device having yielding portions and a cup for causing the fruit to coöperate with said device, one being mounted to reciprocate relatively to the other.

12. The combination with a fruit skin removing device adapted to frictionally contact with fruit at a plurality of points about the same, of two concentric plungers for forcing the fruit through the skin removing device, one having a greater movement than the other during the skin removing operation.

13. The combination with a fruit skin removing device adapted to frictionally contact with fruit at a plurality of points about the same, of a reciprocal member having a cup arranged to engage the fruit and movable to cause the latter to coöperate with the skin removing device, and a reciprocal plunger arranged centrally of the cup and having a greater movement than the latter during the skinning operation.

14. The combination of a fruit skin removing device mounted to support the fruit prior to the removal of the skin, of two concentric plungers for forcing the fruit through the skin removing device, one of said plungers having a greater movement than the other during the skinning operation.

15. The combination with a traveling skin removing device having yielding portions moving to remove the skin, of means traveling and coöperating with said removing device to effect the removal of the skin.

16. The combination with a traveling skin removing device having yielding portions mounted to support the fruit during its travel, of means traveling with the skin removing device and coöperating therewith to force the fruit therethrough, and means for effecting the movement of one of said parts toward the other during their travel.

17. The combination of a traveling fruit skin removing device and a traveling device having yielding portions moving to remove the skin for forcing the fruit through the skin removing device, with means for effecting the movement of one toward the other.

18. The combination of a fruit skin removing device embodying a plurality of radially arranged yielding wipers mounted to travel in a horizontal plane, with means for forcing the fruit through the wipers to effect the removal of the skin.

19. The combination of a fruit skin removing device having yielding portions mounted to travel and to support the fruit during its travel, with a plunger traveling with the skin removing device for forcing the fruit through the said device, and a device arranged in the path of the plunger for effecting its movement.

20. The combination of a fruit skin removing device mounted to travel and having yielding portions to support the fruit during its travel, with a plunger traveling with the removing device and movable to force the fruit through the said removing device, a cam for coöperating with said plunger during its travel to effect its movement.

21. The combination of a fruit skin removing device mounted to travel and having yielding portions to support the fruit during its travel, with a plunger traveling with the removing device and movable to force the fruit through the said removing device, a cam for coöperating with said plunger during its travel to effect the skinning, and a spring for moving said plunger in the opposite direction.

22. The combination of a skin removing device mounted to travel and to support the fruit during its travel, with two concentric plungers movable to force the fruit through the skin removing device and traveling with the latter, means for effecting the movement of both plungers to partially force the fruit through the skin removing device, and means for effecting a greater movement of the inner plunger to complete the movement of the fruit through the skin removing device.

23. The combination of a skin removing device mounted to travel and to support the fruit during its travel, with two concentric plungers movable to force the fruit through the skin removing device and traveling with the latter, the outer one engaging the inner one to cause the latter to move therewith, a cam for operating the outer plunger during its travel to effect the movement of both toward the skin removing device, and a cam for operating the inner plunger independently of the outer plunger to completely force the fruit through the skin removing device.

24. The combination of a skin removing device mounted to travel and to support the fruit during its travel, with two concentric plungers movable to force the fruit through the skin removing device and traveling with the latter, the outer one engaging the inner one to cause the latter to move therewith, a cam for operating the outer plunger during its travel to effect the movement of both toward the skin removing device, a cam for operating the inner plunger independently of the outer plunger to completely force the fruit through the skin removing device, and springs one acting on each plunger to move it away from the skin removing device after the cams are passed.

25. The combination with a fruit skin removing device, of two concentric plungers movable to force fruit through the skin removing device, separate devices coöperating with the two plungers to operate them, and separate helical springs surrounding the plungers and acting to move them away from the skin removing device.

26. A fruit skin removing device embodying a plurality of resiliently mounted wipers arranged to frictionally engage the skin about the fruit each wiper having skin removing projections away from its ends.

27. A fruit skin removing device embodying a plurality of resiliently mounted wipers movable in the direction of the passage of fruit through the device and arranged to frictionally engage the skin about the fruit, and cutters carried by the wipers.

28. A fruit skin removing device comprising a plurality of radially arranged and resiliently mounted wipers secured at their inner ends only, and laterally extending cutters carried by the free inner ends of the wipers.

29. The combination with a fruit skin removing device having skin removing faces thereon and means for forcing fruit therethrough, of cutters extending laterally from the skin removing faces and acting on the skin of the fruit as the latter passes through the skin removing device.

30. The combination with a plurality of radially arranged resiliently mounted wipers, secured at their outer ends only, of cutters extending laterally from the wipers near the inner ends of the latter and a plunger having a head of less diameter than the space inclosed by the cutters for forcing the fruit through the wipers.

31. A fruit skin removing machine comprising means for supporting the fruit, and a plunger movable toward the fruit to engage it, having a cup-shaped and roughened fruit engaging surface and a rotary movement during the engagement to loosen the skin.

32. A fruit skin removing machine comprising a skin removing device constructed to permit the whole fruit to pass therethrough and means engaging the fruit to force it through said device to remove the skin and having a rotary movement to loosen the skin.

33. A fruit skin removing machine comprising a skin removing device constructed to permit the whole fruit to pass therethrough and a plunger movable to force the fruit through the removing device, having a rotary movement during such action to loosen the skin.

34. The combination with a traveling skin removing device, of a traveling plunger for coöperation therewith to force the fruit therethrough, a gear carried by the plunger, and a rack arranged to coöperate with the gear to rotate the plunger in order to loosen the skin.

35. The combination with a traveling skin removing device, of two concentric plungers connected for simultaneous and independent movement toward the skin removing device and traveling with the latter, a cam acting on one of the plungers to move both, a cam acting on the other to move it independently, a gear carried by one of the plungers, and a rack arranged to be engaged by the gear during the movement of both plungers.

36. The combination with a traveling skin removing device, of two concentric plungers connected for simultaneous and independent movement toward the skin removing device and traveling with the latter, blocks carrying rollers journaled on the plungers, means for holding said blocks against rotation with the plungers, a cam coöperating with the roller of one plunger to effect the movement of both plungers, a cam coöperating with the roller on the other plunger to effect an independent movement of the latter, a gear carried by one plunger, and a rack arranged to be engaged by the gear prior to the independent movement.

37. The combination with a traveling skin removing device, of a bracket supported from one side of the skin removing device, a plunger movable on the bracket to force the fruit through the skin removing device, and a brush supported at one end independently of the skin removing device on the side thereof opposite the bracket.

JOHN W. CARNOCHAN.

Witnesses:
RUSSELL B. GRIFFITH,
HAROLD H. SIMMS.